United States Patent [19]

Terasaka et al.

[11] Patent Number: 5,511,215
[45] Date of Patent: Apr. 23, 1996

[54] DEBUGGING SYSTEM FOR THE LOADING AND EXECUTION OF DATA FLOW PROGRAMS

[75] Inventors: Toshiaki Terasaka; Tsuyoshi Muramatsu, both of Tenri; Souichi Miyata, Nara; Tatsuyuki Kuwabara, Mitaka; Masaharu Tomita, Mitaka; Kiyotaka Nagamura, Mitaka; Takao Nakamura, Mitaka, all of Japan

[73] Assignees: Sharp Kabushiki Kaisha, Osaka; Japan Radio Co., Ltd., Tokyo, both of Japan

[21] Appl. No.: 141,210

[22] Filed: Oct. 26, 1993

[30] Foreign Application Priority Data

Oct. 27, 1992 [JP] Japan ..................................... 4-288729

[51] Int. Cl.⁶ .............................. G06F 9/00; G06F 15/82
[52] U.S. Cl. .......................... 395/800; 364/228; 364/229; 364/232.22; 364/DIG. 1
[58] Field of Search ..................................... 395/800, 775, 395/650, 575, 500, 375; 364/131–134

[56] References Cited

U.S. PATENT DOCUMENTS

| | | | |
|---|---|---|---|
| 5,021,947 | 6/1991 | Campbell et al. | 395/700 |
| 5,093,919 | 3/1992 | Yoshida et al. | 395/800 |
| 5,165,036 | 11/1992 | Miyata et al. | 395/800 |
| 5,327,569 | 7/1994 | Shima et al. | 395/800 |
| 5,333,320 | 7/1994 | Seki | 395/650 |

FOREIGN PATENT DOCUMENTS

5181984 7/1993 Japan.

Primary Examiner—Alyssa H. Bowler
Assistant Examiner—Alpesh M. Shah

[57] ABSTRACT

A data processing system includes a data driven processor for carrying out a plurality of different information processing in parallel using respective plurality of provided data packets, a router, and a plurality of von Neumann processors. When a von Neumann processor provides program data packets to the data driven processor via the router to carry out program loading in the data driven processor, another von Neumann processor provides to the data driven processor a data packet storing dumping information via the router. The data driven processor dumps and provides a loaded program data according to the dumping instruction of the provided packet. Therefore, a plurality of von Neumann processors can be connected on-line to at least one data driven processor to carry out in parallel a plurality of different types of data transfer between the data driven processor and each von Neumann processor. These transfers include: (1) dumping a loaded program data packet to a von Neumann processor during loading of other program data packets for on-line verification of proper loading; and (2) outputting an operation result, of an operation process performed by the data driven processor, to the von Neumann processor for verification of proper operation processing during the continued operation processing of the data driven processor.

9 Claims, 8 Drawing Sheets

381c : FIRING CONTROL FLAG

DEBUGGING SYSTEM FOR THE LOADING AND EXECUTION OF DATA FLOW PROGRAMS

BACKGROUND OF THE INVENTION

1. Field of the Invention

The present invention relates to data processing systems, and more particularly, to a data processing system that connects a data driven type information processor with an existing system formed including a yon Neumann type information processor to carry out data transfer therebetween.

2. Description of the Background Art

In a conventional von Neumann type information processor, various instructions are prestored in a program memory as a program. Instructions are sequentially read out by specifying sequentially an address of the program memory with a program counter to execute the read out instruction.

A data driven type information processor is a type of a non-yon Neumann type information processor that does not employ the concept of executing sequential instructions with a program counter. Such a data driven type information processor employs an architecture based on parallel processing of instructions. In a data driven type information processor, execution of an instruction is allowed as soon as data to be calculated is provided, so that a plurality of instructions are driven simultaneously by data. Therefore, a data flow program is executed in parallel according to the natural flow of data. As a result, it is regarded that the time required for operation is reduced significantly.

Figure 9:
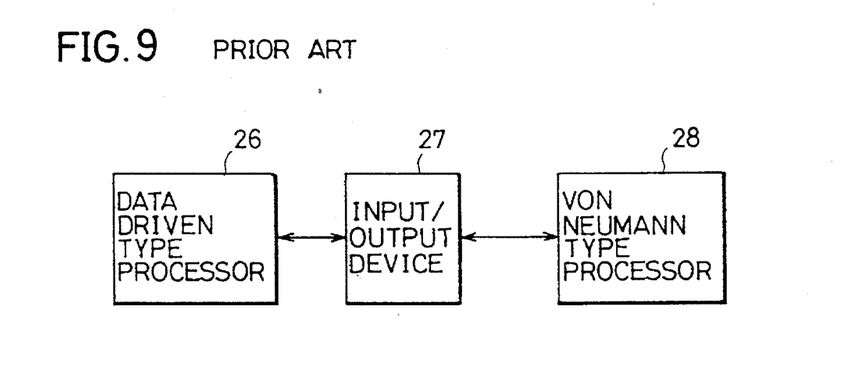
FIG. 9 is a diagram of a structure of a conventional data processing system including a data driven type information processor and a von Neumann type information processor.

FIG. 9 shows a structure of a conventional data processing system including a data driven type information processor and a von Neumann type information processor.

A data driven type information processor (referred to as "data driven type processor" hereinafter) 26 shown in FIG. 9 is used connected to a dedicated input/output unit 27. Input/output unit 27 is provided to supply to data driven type processor 26 external data packets for loading a data flow program to data driven type processor 26 and executing a loaded data flow program. When such a data driven type processor 26 used with a dedicated input/output unit 27 is to be connected to a von Neumann type information processor (referred to as "von Neumann type processor" hereinafter) 28 which is an existing system, von Neumann type processor 28 is connected to input/output unit 27 to carry out serial transfer on-line between von Neumann type processor 28 and data driven type processor 26 via input/output unit 27. This means that there was only one port connecting data driven type processor 26 and von Neumann type processor 28. Therefore, a plurality of different types of data transfer could not be carried out simultaneously.

Because there was only one port connecting data driven type processor 26 and von Neumann type processor 28 in a conventional data processing system as shown in FIG. 9, the reliability of the operation of data driven type processor 26 was confirmed as set forth in the following. First, an instruction code to carry out a predetermined process is applied to data driven type processor 26 from von Neumann type processor 28 via input/output unit 27. A predetermined process according to that instruction code is carried out in processor 26. After completion of this process, an instruction code for confirming this operation of the predetermined process is applied from von Neumann type processor 28 to data driven type processor 26 via input/output unit 27, whereby a process is carried out in processor 26 according to the instruction code. By analyzing the process resultant data using processor 28, the reliability of the operation of data driven type processor 26 was confirmed. Although this method allows confirmation of the reliability of the operation result of a predetermined process of data driven type processor 26, the operation status of a predetermined process (status during program execution) could not be confirmed in real-time. To confirm the reliability of the operation of a data driven type processor 26, information obtained by monitoring in real-time the operation status (status during program execution) is indispensable to debug a data flow program and to analyze the operation of the processor itself. A conventional data processing system had a disadvantage that reliability of operation of the system or data driven type processor 26 could not be monitored in real-time while carrying out operation thereof. This also induced the problem of making difficult the operation analysis of the system formed including data driven type processor 26 or processor 28.

SUMMARY OF THE INVENTION

An object of the present invention is to provide a data processing system having a data driven type information processor connected to a system including a von Neumann type information processor in which transfer of a plurality of different types of data can be carried out simultaneously between the data driven type information processor and the system including the yon Neumann type information processor.

Another object of the present invention is to provide a data processing system having a data driven type information processor connected to a system including a yon Neumann type information processor in which the operation of the data driven type information processor can be analyzed in real-time by the von Neumann type information processor.

In view of the foregoing, a data processing system according to the present invention includes a data driven type information processor having a plurality of input ports to receive in parallel respective data packets supplied to each of the input ports for carrying out a plurality of different information processing in parallel using the received data packets, a control device for receiving in parallel a plurality of supplied data packets for providing the received data packets to respective input ports of the data driven type information processor, and a plurality of von Neumann type information processors for supplying a different type of data packet to the control device. Because the control device provides in parallel to the data driven type information processor a plurality of data packets of different types provided from respective plurality of von Neumann type information processors, it is possible to connect on-line a plurality of von Neumann type information processors to the data driven type information processor to carry out transfer of a plurality of different types of data simultaneously.

Furthermore, because it is possible to carry out in parallel different information processing in the data driven type information processor via each of the plurality of von Neumann type information processors, a data processing system of high processing efficiency can be obtained.

The above-described data processing system further includes an output medium which is shared by the plurality of von Neumann type information processors and the data driven type information processor. The data driven type information processor further includes an input/output control unit and an information processing unit. The information processing unit carries out a predetermined information processing in parallel with a monitor processing of providing the progress state of the predetermined information processing sequentially as a data packet using the respective plurality of different types of data packets provided from the plurality of yon Neumann type information processors via the control device and the input/output control unit. The data packet provided by the monitor processing is output sequentially to the output medium by the input/output control unit. Each von Neumann type processor further includes analyzing unit for analyzing in real-time the progress state of the predetermined information processing according to the contents provided to the output medium. Therefore, the progress state of a predetermined information processing can be monitored and analyzed in real-time by the analyzing unit.

The input/output control unit of a data driven type information processor receives a data packet supplied to each input port of that data driven type information processor or a data packet provided from the information processing unit of that data driven type information processor to selectively provide the received packet to the information processing unit of that data driven type information processor for information processing. In other words, a data packet that does not need to be processed in the data driven type information processor can be selectively output from the information processor by the input/output control unit. Therefore, only data packets that actually require processing resides in the information processing unit of a data driven type information processor, resulting in a faster data process including data transfer in the information processing unit.

The condition of determining selectively the destination of a data packet in the input/output control unit is set or updated according to a first setting/updating unit based on the contents of a data packet supplied to an input port of the data driven type information processor. Therefore, the data packet to be processed in the information processing unit of the data driven type information processor is set/updated arbitrarily. The variety of processing in the data driven type information processor, and also in the data processing system, is expanded.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram of a data driven type information according to an embodiment of the present invention.

DESCRIPTION OF THE PREFERRED EMBODIMENTS

An embodiment of the present invention will be described hereinafter with reference to the drawings.

A data processing system according to the present embodiment is implemented to allow transfer of a plurality of different types of data simultaneously by connecting on-line a data driven type processor and a plurality of von Neumann type processors using a router (a device for adjusting a route). This router serves to select a route (path) for data transfer, and details thereof will be described afterwards.

Figure 1:
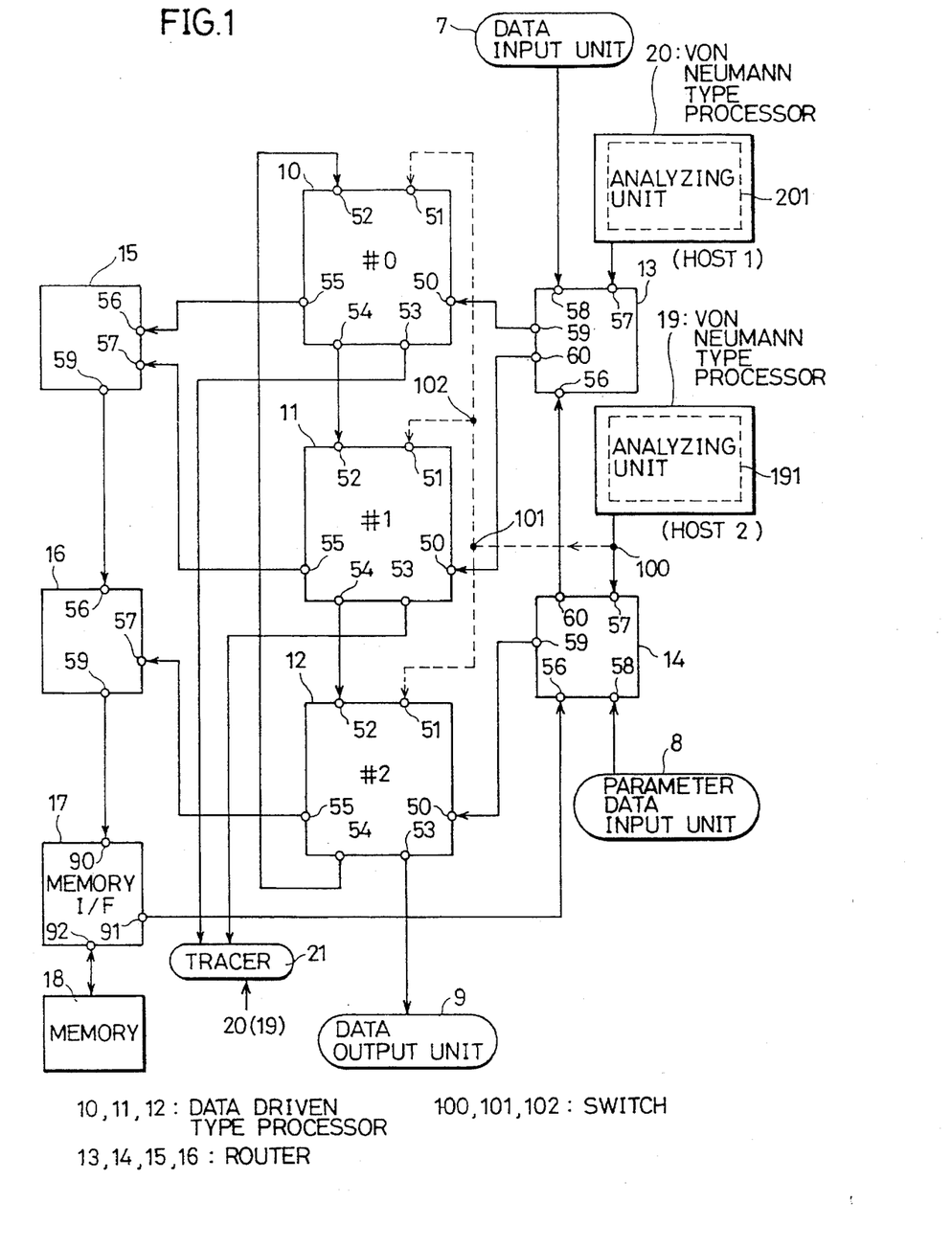
FIG. 1 is a structural diagram of a data processing system according to an embodiment of the present invention.

FIG. 1 shows a structure of a data processing system according to an embodiment of the present invention. The data processing system of FIG. 1 includes a data input unit 7, a parameter data input unit 8, a data output unit 9, data driven type processors 10, 11, and 12, routers 13, 14, 15 and 16, a memory interface (I/F) 17, a memory 18, yon Neumann type processors 19 and 20 including analyzing units 191 and 201, a tracer 21, and switches 100, 101 and 102. Processors 19 and 20 become the host computer for data driven type processors 10–12.

Each of von Neumann type processors 19 and 20 has the functionality to load a data flow program to each data driven type processor, and to monitor in real-time the state of the loaded data flow program executed in each data driven type processor by analyzing unit 191 or 201, in addition to the functionality of the general yon Neumann type data processing.

Data input unit 7 supplies data to be processed in the processing system, that is to say, the data to be operated according to a predetermined data flow program stored in each data driven type processor. Parameter data input unit 8 supplies parameter data associated with the process in the data processing system, that is to say, supplies parameter data for an operational process according to a predetermined data flow program stored in each data driven type processor.

Data output unit 9 is implemented including an output device such as a display or a printer to display or print data provided from data driven type processor 12.

Memory 18 is formed of a random access memory or the like to serve as an external memory of data driven processors 10–12. Memory I/F 17 serves to control the access to memory 18. Tracer 21 is implemented including an assembly of memories to store processed resultant data from data driven type processors 10 or 11. It can be accessed also by von Neumann type processors 19 and 20.

The path represent by a solid line in FIG. 1 indicates a path used for general data transfer. The path represented by a broken line indicates a path for transferring data to confirm the reliability of the data transfer path indicated by the solid line. The broken line indicates a plurality of paths which are selectively switched according to the switching operation of switches 100–102. More specifically, switch 100 has its input side connected to the output side of von Neumann type processor 19 to selectively connect the output side of processor 19 to one of the input sides of switch 101 and router 14. Switch 101 has its input side connected to one output side of switch 100 to selectively connect the one output side of switch 100 to the input side of either switch 102 or data driven type processor 12. Switch 102 has its input side connected to one output side of switch 101 to selectively connect the one output of switch 101 to the input side of either data driven type processor 10 or 11.

Each router includes input ports 56, 57 and 58, and output ports 59 and 60. It is to be noted that ports 58 and 60 are not shown since they are not used in routers 15 and 16. Each data driven type processor includes input ports 50, 51 and 52, and output ports 53, 54 and 55. Memory I/F 17 includes an input port 90 and an output port 91, and a port 92 for accessing memory 18.

In router 13, input ports 56, 57, 58, and output ports 59, and 60 are connected to output port 60 of router 14, the output side of processor 20, the output side of data input unit 7, input port 50 of data driven type processor 10, and input port 50 of data driven type processor 11, respectively.

In router 14, input ports 56, 57, and 58, and output port 59 are connected to port 91 of memory I/F 17, the output side of von Neumann type processor 19 via switch 100, the output side of parameter data input unit 8, and input port 50 of processor 12, respectively.

In router 15, input ports 56, 57, and output port 59 are connected to output port 55 of data driven type processor 10, output port 55 of data driven type processor 11, and input port 56 of router 16, respectively. Router 16 has its input port 57 connected to output port 55 of data driven type processor 12, and its output port 59 connected to input port 90 of memory I/F 17.

Data driven type processor 10 has its input ports 51 and 52 connected to the output side of von Neumann type processor 19 via respective switches 100–102, and output port 54 of data driven type processor 12, respectively, and output ports 53 and 54 connected to the input side of tracer 21 and input port 52 of data driven type processor 11, respectively.

In data driven type processor 11, input port 51 is connected to the output side of von Neumann type processor 19 via respective switches 100–102. Output ports 53 and 54 are connected to the input side of tracer 21 and input port 52 of data driven type processor 12, respectively.

Data driven type processor 12 has its input port 51 connected to the output side of von Neumann type processor 19 via switches 100 and 101, and output port 53 connected to the input side of data output unit 9.

In order to identify each of data driven type processors 10–12 uniquely in the present data processing system, each processor is allotted with a processor number of #0, #1, and #2 in order.

Figure 2:
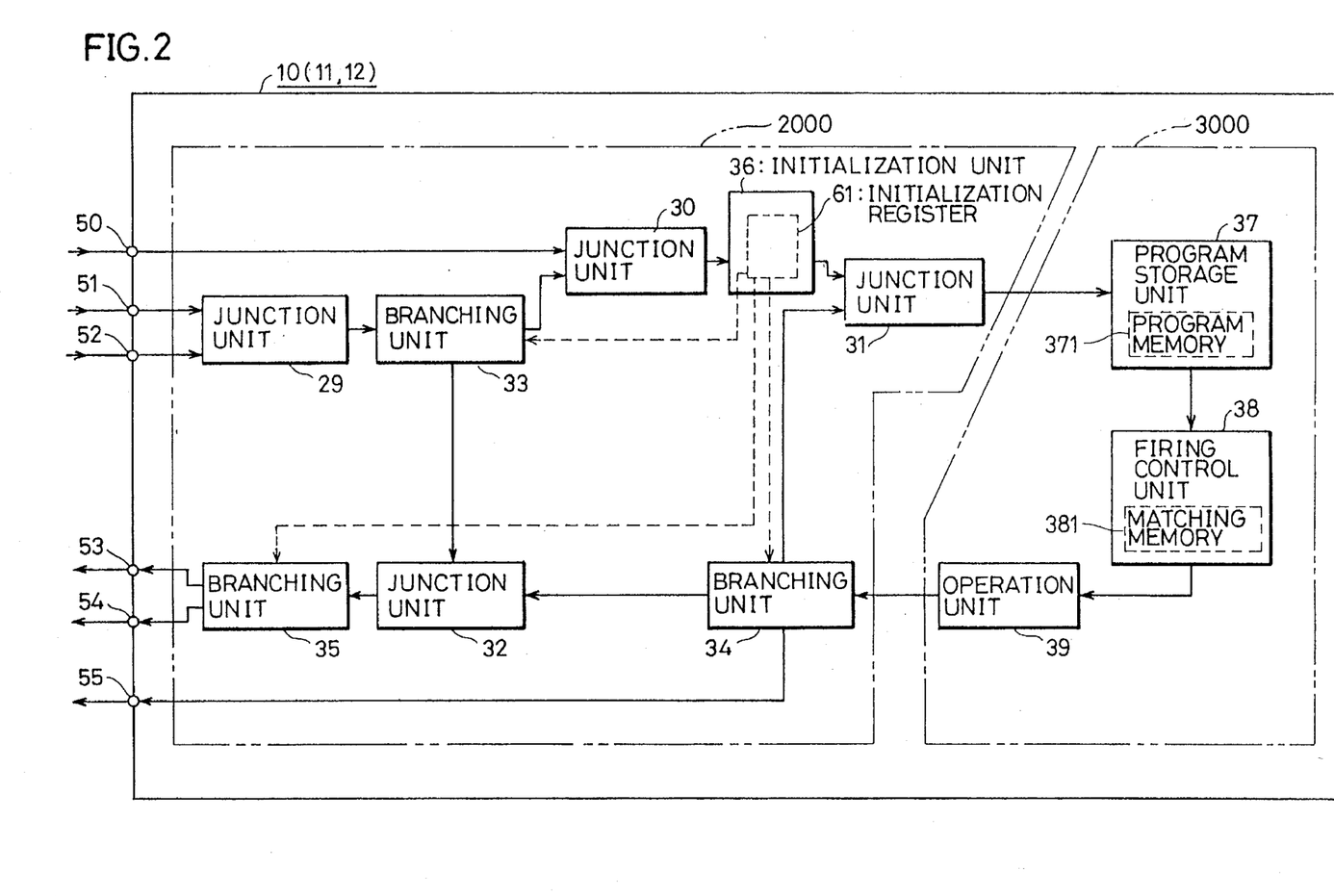

The structure of each data driven type processor of FIG. 1 is shown in FIG. 2. The field structure of a data packet processed therein is shown in FIGS. 3A–3D. Each data driven type processor has a similar structure.

Figure 3A:
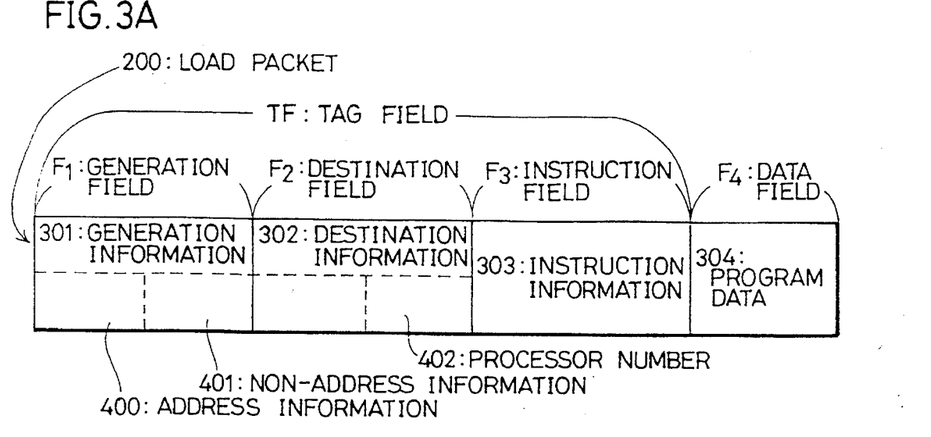
FIGS. 3A–3D show an example of a field structure of a data packet processed by the data driven type processor according to an embodiment of the present invention.
Figure 3B:
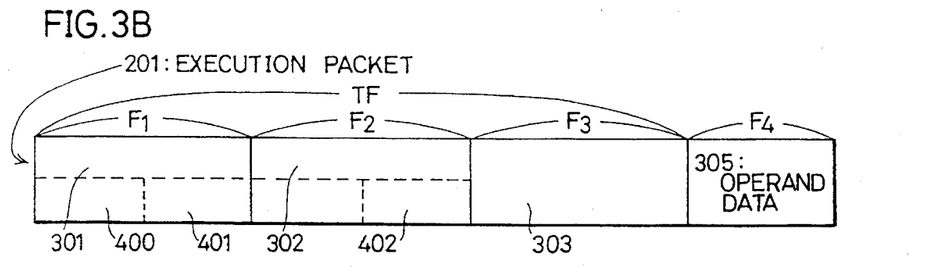
Figure 3C:
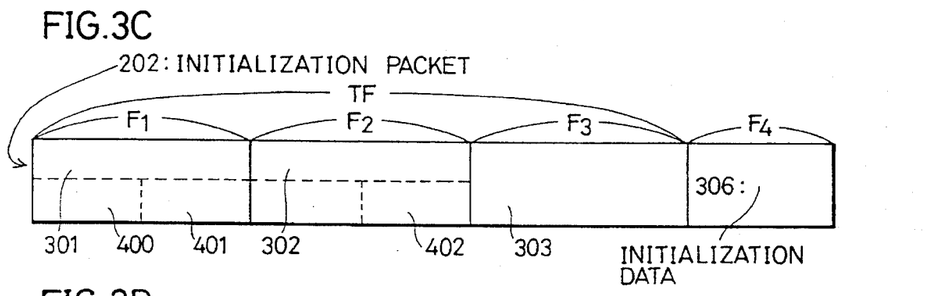
Figure 3D:
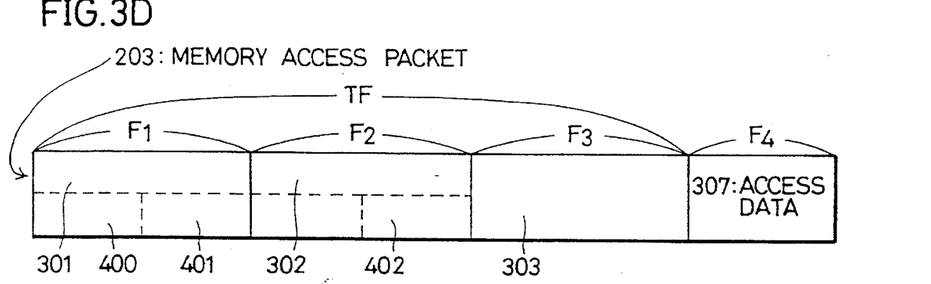

FIG. 3A shows the field structure of a load packet 200 for loading a data flow program to each data driven type processor. FIG. 3B shows the field structure of an execution packet 201 for executing a data flow program preloaded in each data driven type processor. FIG. 3C shows the field structure of an initialization packet 202 for initializing each data driven type processor. FIG. 3D shows the field structure of a memory access packet 203 for accessing memory 18 or a memory in each data driven type processor.

As shown in FIGS. 3A–3D, each data packet includes a tag field TF including a generation field F1, a destination field F2 and an instruction field F3, and a data field F4. Generation information 301 including address information 400 and non-address information 401 is stored in generation field F1. Destination information 302 including a processor number 402 for identifying a data driven type processor to which that data packet is to be supplied is stored in field F2. Instruction information 303 is stored in field F3. Program data 304 which is loaded by a corresponding instruction information 303 is stored in data field F4 of load packet 200. Operand data 305 to be calculated by a corresponding instruction information 303 is stored in field F4 of execution packet 201. Initialization data 306 used for initialization by a corresponding instruction information 303 is stored in field F4 of initialization packet 202. Access data 307 concerning memory access by a corresponding instruction information 303 is stored in field F4 of memory access packet 203.

Referring to FIG. 2, data driven type processor 10 (11, 12) includes an input/output control unit 2000 and a processing unit 3000. Input/output control unit 2000 includes junction units 29, 30, 31 and 32, branching units 33, 34 and 35, and an initialization unit 36 with an initialization register 61. Processing unit 3000 includes a program storage unit 37 including a program memory 371, a firing control unit 38 including a matching memory 381, and an operation unit 39. Each branching unit switches the output destination of input data according to a predetermined branching condition which will be described afterwards.

Junction unit 29 provides a data packet input via input ports 51 and 52 to branching unit 33 in the order they were input. Junction unit 30 provides a data packet input from merging unit 33 and input port 50 to initialization unit 36 in the order they were input. Junction unit 31 provides a data packet input from initialization unit 36 and branching unit 34 to program storage unit 37 in the order they were input. Junction unit 32 provides to branching unit 35 a data packet input from branching units 33 and 34 in order they where input.

Figure 4:
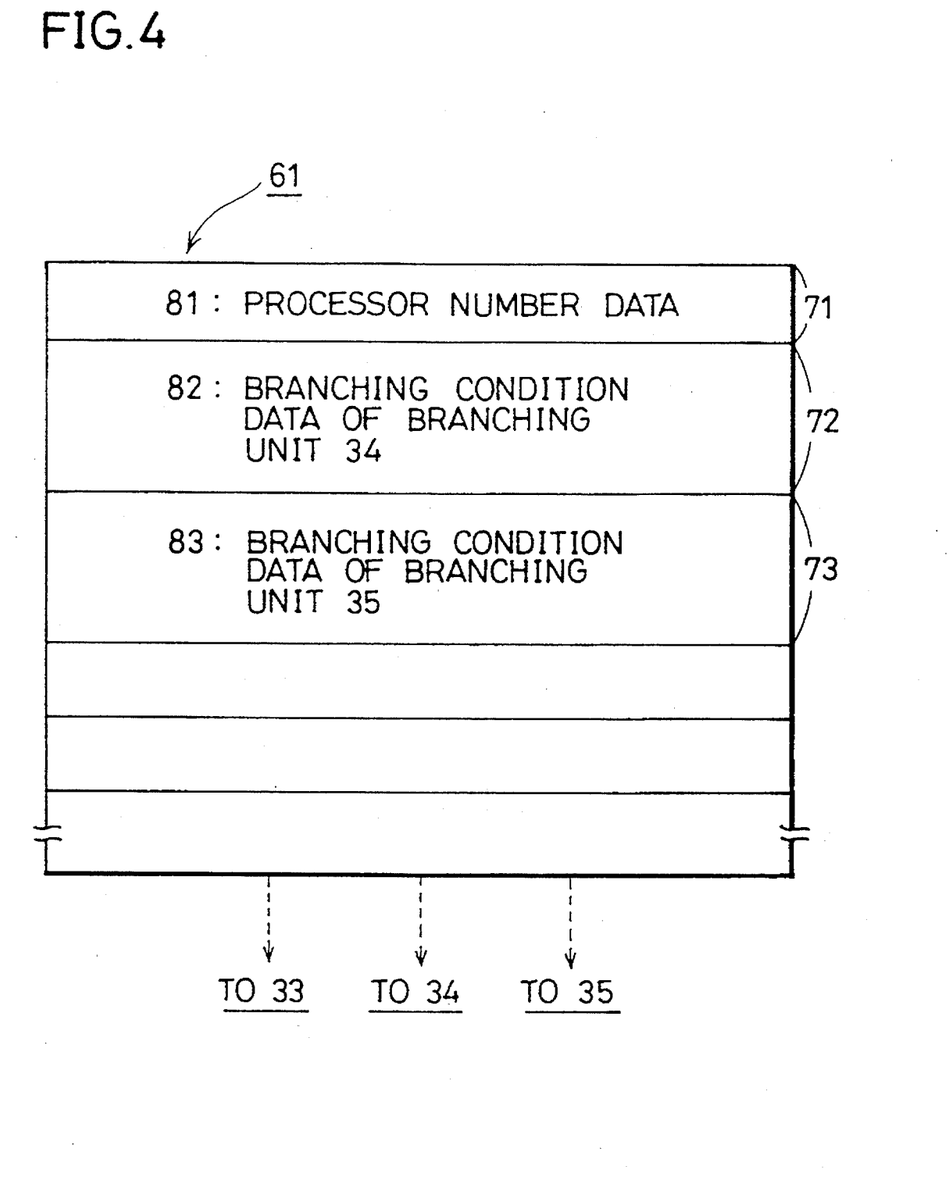
FIG. 4 partially shows the stored contents of an initialization register in a data driven type processor according to an embodiment of the present invention.

The stored contents of initialization register 61 of initialization unit 36 is referred to by branching units 33, 34 and 35 respectively through the path indicated by the broken lines in the drawing. The stored contents include data that determines the branching operation. The stored contents of initialization register 61 is partially shown in FIG. 4. Referring to FIG. 4, initialization register 61 includes storage regions 71–73. Processor number data 81 of that processor 10 (11, 12) is stored in storage region 71. Branching condition data 82 and 83 for designating the output destination of an input data packet of each of branching units 34 and 35 are stored in storage regions 72 and 73, respectively. Each of data 81–83 is set using initialization packet 202 at the time of initialization of the processor.

The operation of each branching unit shown in FIG. 2 is carried out according to data stored in initialization register 61. When a data packet is input from junction unit 29, branching unit 33 compares processor number 402 in that input data packet with processor number data 81 in register 61. If the number matches, the input packet is provided to junction unit 30, otherwise to junction unit 32. When a data packet is input from operation unit 39, branching unit 34 sends that input packet to junction unit 31 provided that it is to be continuously processed within that processor. If the input data packet should not be continuously processed, branching condition data 82 in register 61 is referred to according to instruction information 303 therein. In accordance with the referred result, the input data packet is provided to either junction unit 32 or output port 55.

When a data packet is input from junction unit 32, branching unit 35 refers to branching condition data 83 in register 61 according to the processor number 402 in that input packet. In accordance with the referred result, the input packet is provided to either output port 53 or 54.

Initialization unit 36 store the processor number 402 of the first initialization packet 202 input right after a reset of the processor as the processor number data 81 into initialization register 61. Only when an initialization packet 202 is input having a processor number 402 stored identically to the processor number data 81 stored in register 61, all the data excluding the processor number data 81 in register 61 are set/updated according to the contents of input data 202. The initialization packet 202 supplied to initialization unit 36 will not be provided to junction unit 31 since it is erased after being used in the data set/update in initialization register 61. When an initialization packet 202 having a processor number 402 not matching the processor number data 81 or another type of packet excluding initialization packet 202 is provided to initialization unit 36, it is passed therethrough.

Figure 5:
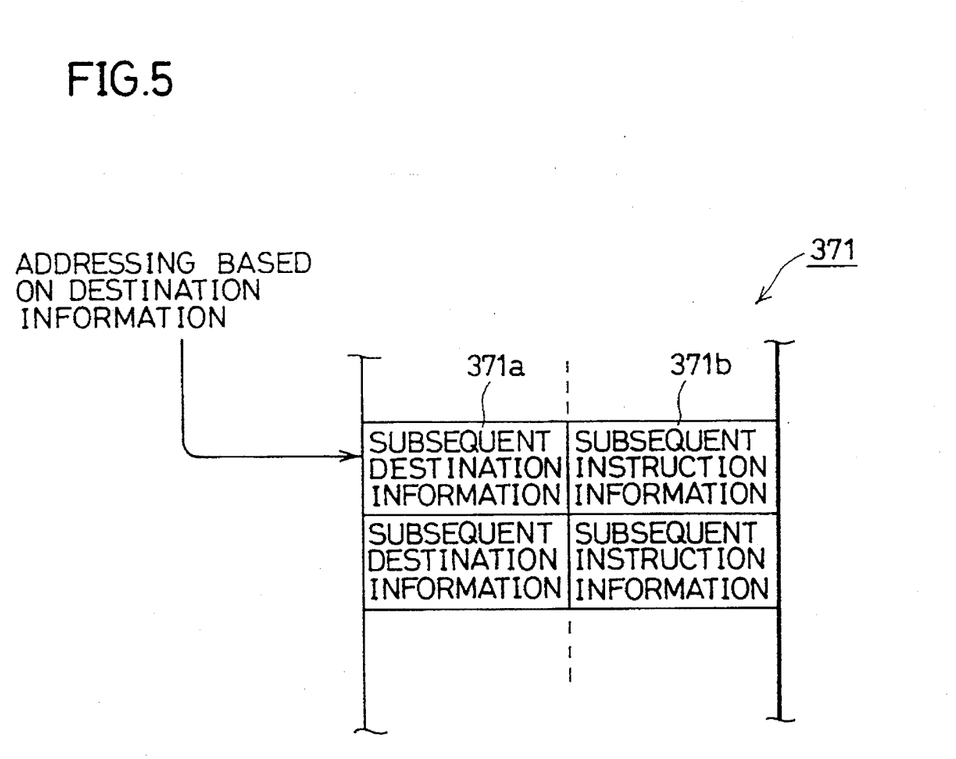
FIG. 5 shows a portion of the stored contents of a program memory of a data driven type processor according to an embodiment of the present invention.

Program storage unit 37 stores a data flow program including a plurality of subsequent destination information 371a and a plurality of subsequent instruction information 371b in program memory 371 as shown in FIG. 5. Loading of this data flow program is carried out using load packet 200. Execution is carried out using execution packet 201. Based on addressing by destination information 302 of an input execution packet 201, a subsequent destination information 371a and a subsequent instruction information 371b are read out from program storage unit 37. Each read out information is respectively stored in fields F2 and F3 of the input execution packet 201. Then, that input packet 201 is output.

Firing control unit 38 receives an execution packet 201 provided from program storage unit 37 to carry out matching of a received packet 201 using matching memory 381. More specifically, two different execution packets 201 having the same destination information 302 and non-address information 401 in generation information 301 are detected from the execution packets 201 provided from program storage unit 37. In response, the operand data 305 in field F4 of one execution packet 201 is additionally stored in field F4 of the other execution packet 201, and the other execution packet is provided to operation unit 39. This operation is called "firing". The above-described one execution packet is eliminated.

Figure 6:
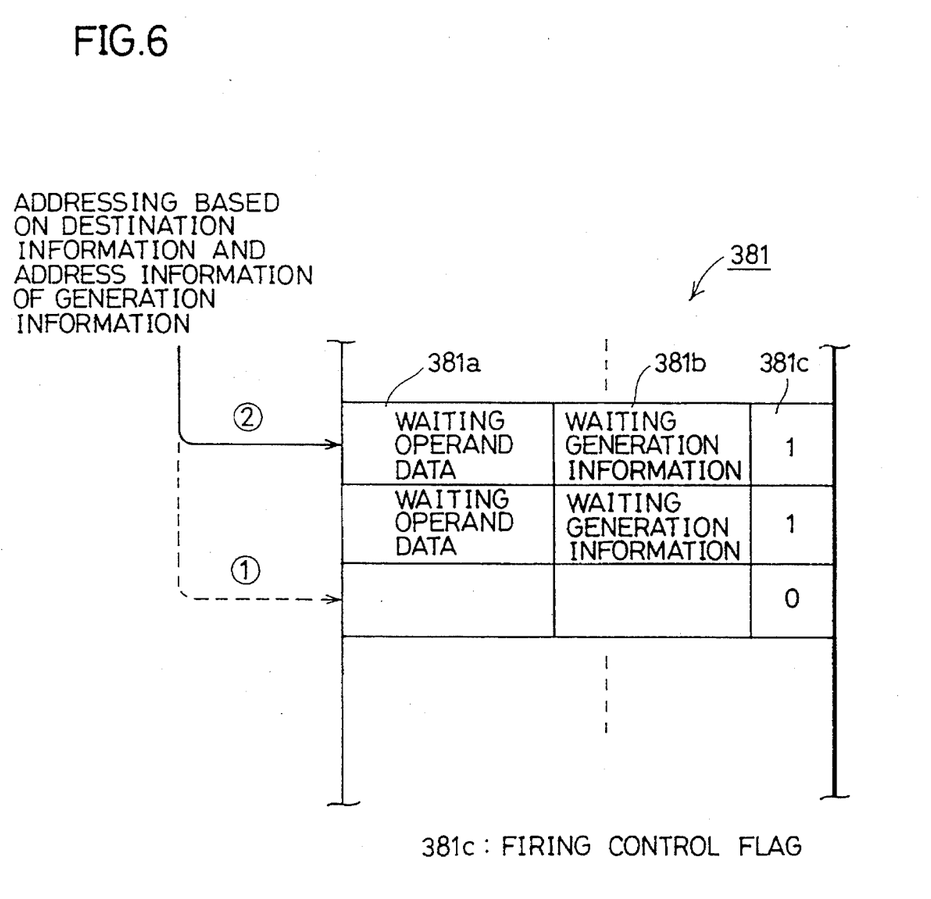
FIG. 6 shows a portion of the stored contents of a matching memory in a data driven the processor according to an embodiment of the present invention.

The matching operation using matching memory 381 of firing control unit 38 will be described hereinafter with reference to FIG. 6. Referring to FIG. 6, the stored contents of matching memory 381 is partially indicated. Matching memory 381 stores waiting data including waiting operand data 381a, waiting generation information 381b, and a firing control flag 381c. Firing control unit 38 accesses matching memory 381 by addressing based on destination information 302 and address information 400 of generation information 301 of an input execution packet 201. If firing control flag 381c stored in the addressing area is "0", operand data 305 of the input execution packet 201 is written into this addressing area as waiting operand data 381a, and the non-address information 401 of generation information 301 of the input packet 201 is written as matching generation information 381b. Then, this execution packet 201 is eliminated, and firing control flag 831c of that area is set to "1" (refer to ① of FIG. 6). If firing control flag 381c of the aforementioned addressing area is "1" and the waiting generation information 381b of that area matches the non-address information 401 of the generation information 301 of the input execution packet 201, the above-described firing is detected and firing control flag 381c of the addressing area is set to "0" (refer to ② of FIG. 6). If the firing control flag 381c of the addressing area is "1", and the waiting generation information 381b of the addressing area does not match the non-address information 401 of the generation information 301 in the input execution packet 201, the above-described firing is not detected, so that the input packet 201 is provided to operation unit 39 as a un-fired packet (a data packet to have its operation continued in the data driven type processor) from firing control unit 38. This un-fired packet is subjected to no processing in each unit and provided to junction unit 31 in branching unit 34 to circulate the interior of the processor until a firing is detected of the un-fired packet in firing control unit 38.

Operation unit 39 receives an execution packet 201 provided from firing control unit 38 to decode instruction information 303 therein. According to the decoded result, a predetermined process is applied to the operand data 305 in the input packet 201. The operational result is stored in data field F4 of the input packet 201. This input packet 201 is provided to branching unit 34.

Thus, in data driven type processor 10 (11, 12), an execution packet 201 provided from any of input ports 50–52 is applied to junction unit 31 via junction unit 29, branching unit 33, junction unit 30, and initialization unit 36. The execution packet will circulate in the sequence of junction unit 31→program storage unit 37→firing control unit 38→operation unit 39→branching unit 34→junction unit 31→program storage unit 37 . . . , whereby operational process according to a data flow program stored in program memory 371 is carried out. The result is provided external to the processor via any of branching unit 34, junction unit 32, branching unit 35, and output ports 53–55.

The operation of the data driven type processor will be described hereinafter.

At the time of initialization, a data driven type processor is reset. Immediately after this reset, an initialization packet 202 is applied via an input port. Because input packet 202 passes through junction unit 30 to be provided to initialization unit 36, initialization unit 36 sets the processor number 402 stored in the input packet 202 as the processor number data 81 in register 61. Then, an initialization packet 202 storing the branching condition data 82 of branching unit 34 as initialization data 306 and an initialization packet 202 storing the branching condition data 83 of branching unit 35 as initialization data 306 are provided to initialization unit 36 via input port 50 and junction unit 30. When the processor number 402 of input packet 202 matches the processor number data 81 in register 61, initialization data 306 of that input packet is written into storage region 72 or 73 according to instruction information 303 in that input packet 202 to initialize branching condition data 82 or 83. The packet 202 used for data setting in initialization register 61 is eliminated in initialization unit 36 after data setting.

Processor number data 81 is set using only the initialization packet 202 provided right after the processor is reset. Branching condition data 82 and 83 are updated appropriately when an initialization packet 202 storing a processor number 402 identical to the processor number data 81 is applied.

Thus, when an initialization packet 202 is provided, the set data in initialization register 61 is updated appropriately.

After the above-described initialization of a data driven type processor, a data flow program is loaded to program memory 371. At the time of program loading, a load packet 200 is applied via an input port. Input packet 200 is applied to program storage unit 37 via the route of junction unit 30→initialization unit 36→junction unit 31. Program storage unit 37 writes into program memory 371 the program data 304 in the input packet 200 according to instruction information 303 including a loading instruction in the input packet 200. At the time of program loading, the above-described operation of writing an input packet 200 into program memory 371 is carried out repeatedly since a plurality of load packets 200 are provided from an external source. Thus, a data flow program is loaded into program memory 371 as shown in FIG. 5.

After the above-described data flow program loading operation, or in parallel with the program loading, a memory access packet 203 is applied to dump the contents of program memory 371 to confirm whether program loading is carried out properly or not. Because memory dumping is aimed to confirm whether the route that the load packet 200 follows is proper or not, memory access packet 203 is provided through a route differing from the route of load packet 200.

First, memory access packet 203 is applied via an input port to be provided to branching unit 33 via junction unit 29. Branching unit 33 receives a packet 203 to verify whether the processor number 402 therein matches the processor number 81 in register 61. If the number matches, that received packet 203 is provided to junction unit 30, otherwise to junction unit 32. In the case of the latter, the received packet 203 is provided external to the processor. Junction unit 30 receives a packet 203 from branching unit 33 to provide the same to initialization unit 36. The packet 203 is provided to program storage unit 37 via the route of initialization unit 36→junction unit 31. Program storage unit 37 reads out the program data loaded in program memory 371 according to instruction information 303 including a dumping instruction in the input packet 203. The read out data is stored in field F4 of the input packet 203 as access data 307. Then, that input packet 203 is passed along the route of firing control unit 38→operation unit 39→branching unit 34→junction unit 32→branching unit 35 to be provided external to the processor via output port 53. It is to be noted that branching unit 34 verifies the destination information 302 of the input packet 203 and branching condition data 82 of register 61, and branching unit 35 verifies destination information 302 of the input packet 203 and branching condition data 83 of register 61, so that the above-described route is selected according to the verified result.

Thus, a loaded program data can be dumped to be provided external to the data driven type processor in parallel with program loading to the processor.

When the above-described data flow program loading operation is completed, an execution packet 201 for carrying out data processing using the loaded program is applied via input ports 50-52. As described above, input packet 201 circulates inside the processor, whereby an operation process according to the data flow program stored in program memory 371 is executed. The result is stored in data field F4 of that packet 201 to be output via a selected one of output ports 53-55.

In the case of modifying parameter data concerning the relevant data flow program during execution of the program, a load packet 200 storing this parameter data in data field F4 is provided via input port 50. This load packet 200 is provided to program storage unit 37 via a route identical to that at the time of the above-described program loading operation. In response, the parameter data in the program data stored in memory 371 is updated by the contents of field F4 of the relevant input packet 200. By just supplying a load packet 200 storing parameter data, parameter data in the loaded data flow program can be changed arbitrarily to carry out operational processing using the modified parameter data.

When an operation is executed so as to access memory 18 which is external to each processor during execution of an operational process according to a data flow program, a data packet 203 for accessing memory 18 is output via branching unit 34 and output port 55 in each processor. The packet 203 provided from output port 55 for accessing memory 18 is output external to the processor.

Thus, each processor carries out an operation processing according to a data flow program based on information in an input execution packet 201, as well as to provide an execution packet 201 storing the operational result external to the processor via any selected output port of 53-55.

Figure 7:
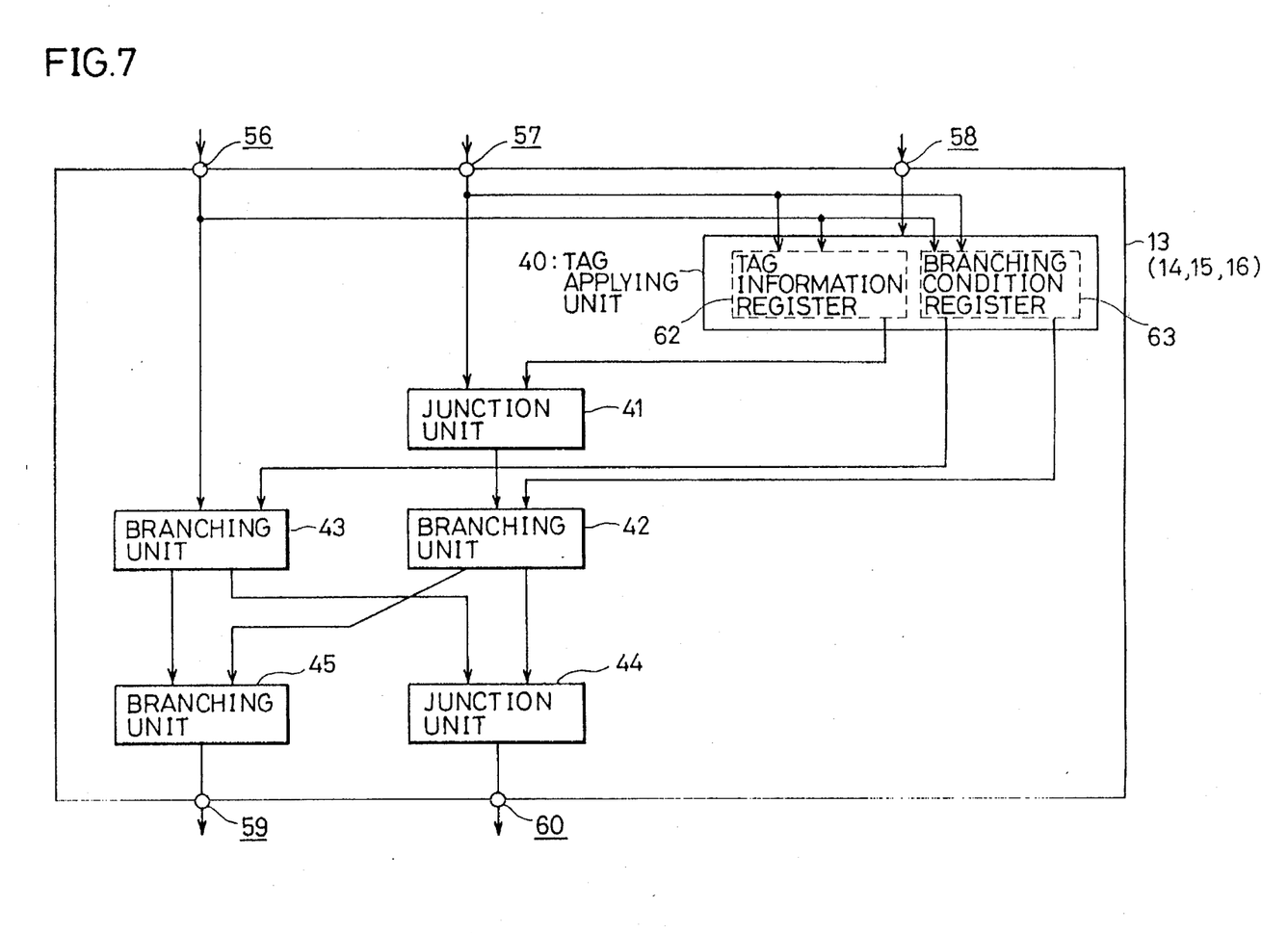
FIG. 7 is a block diagram of the structure of a router employed in a data processing system according to an embodiment of the present invention.

FIG. 7 is a block diagram showing an example of a structure of the router shown in FIG. 1. Each router has a similar block structure. Referring to FIG. 7, router 13 (14, 15, 16) includes a tag applying unit 40, junction units 41, 44 and 45, and branching units 42 and 43. The block structure of tag applying unit 40 is shown in FIG. 8.

Figure 8:
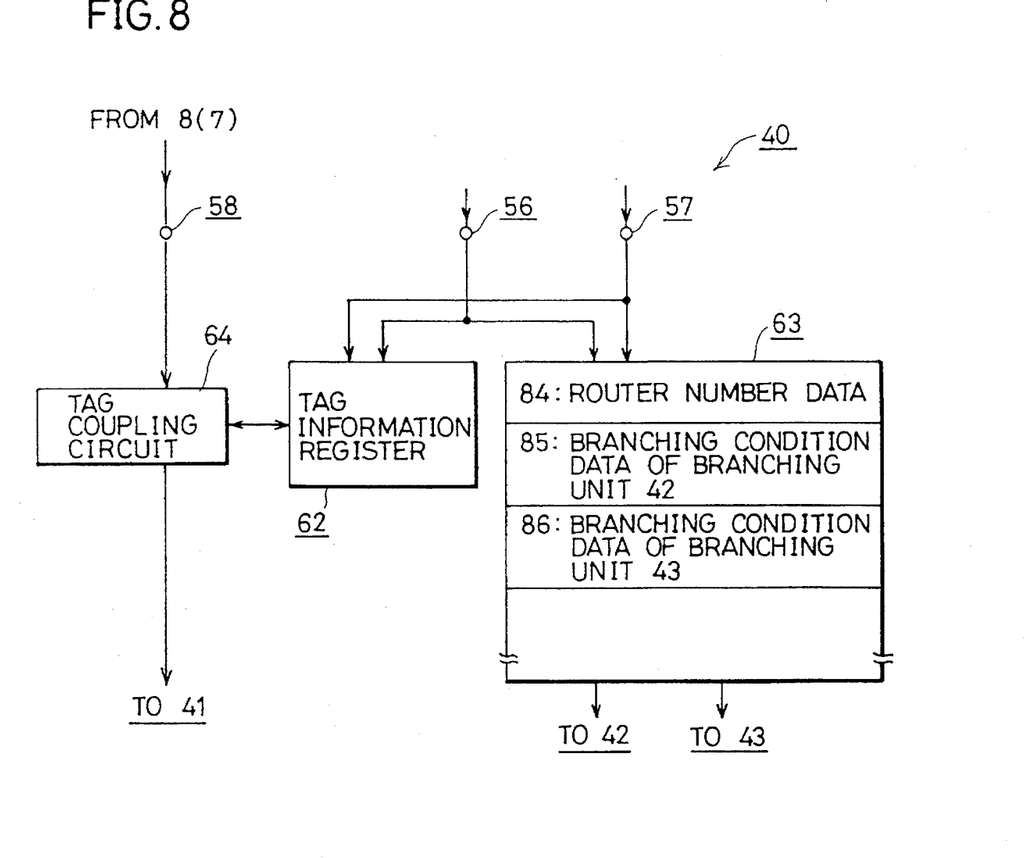
FIG. 8 is a block diagram of a structure of a tag applying unit employed in the router according to an embodiment of the present invention.

Referring to FIG. 8, tag applying unit 40 includes a tag information register 62, a branching condition register 63, and a tag coupling circuit 64. Registers 62 and 63 are initialized using an initialization packet provided from input port 56 or 57 at the time of initializing the router. Tag information register 62 is initialized with a plurality of different generation information and tags (including destination information or instruction information). Branching condition register 63 is initialized with router number data 84 for specifying a router uniquely, and branching condition data 85 and 86 associated with branching units 42 and 43. After initialization of a relevant router, tag coupling circuit 64 receives data provided from input port 58. In accordance with the input order, generation information and a tag is read out from tag information register 62. The read out generation information and tag are coupled to an input data to generate a data packet. The generated data packet is provided to junction unit 41.

Referring to FIG. 7, junction unit 41 receives a data packet from input port 57 or tag applying unit 40 to provide the same to branching unit 42 in a first-come first-out order. Branching unit 42 compares destination information 302 of the input packet with branching condition data 85 in register 63. According to the result thereof, the relevant input packet is provided to either junction unit 44 or 45.

Branching unit 43 receives a data packet from input port 56 to compare destination information 302 in the received packet with branching condition data 86 in register 63. In accordance with the result thereof, that received packet is provided to either junction unit 44 or 45.

Junction unit 44 outputs an input packet via an output port 60 in the input sequence. Junction unit 45 also outputs an input packet via an output port 59 in the input sequence of the packet.

Routers 15 and 16 shown in FIG. 1 do not use input port 58 and output port 60. Therefore, routers 15 and 16 have data regarding register 63 set with router number data 84, branching condition data 85 and 86 specifying output port 59 using an initialization packet entered from input port 56 or 57. Thus, routers 15 and 16 have the input packet from input ports 56 and 57 output in the input sequence via output port 59.

The operation of the data processing system of FIG. 1 will be described hereinafter.

When the system is reset to carry out an initialization operation, registers 62 and 63 of router 13 are initialized using von Neumann type processor 20, and registers 62 and 63 of router 14 are initialized using von Neumann type processor 19. Each data driven type processor has initialization register 61 of initialization unit 36 initialized. More specifically, von Neumann type processor 20 provides to router 13 an initialization packet 202 to initialize the processor number of processor 0 to "#0" and an initialization packet 202 to initialize processor 11 to the processor number "#1", respectively. Packet 202 having initialization data 306 of "#0" is output via output port 59 of router 13 to be provided to input port 50 of processor 10. Processor 10 receives initialization packet 202 via input port 50, whereby data 81 in register 61 is initialized with initialization data 306 stored therein. Initialization packet 202 having initialization data 306 of "#1" is applied to input port 50 of processor 11 via output port 60, whereby initialization data 306 of the packet 202 is set as data 81 in register 61. Also, von Neumann type processor 19 provides an initialization packet 202 to router 14 to set a processor number of "#2" in processor 12. This initialization packet 202 is output via output port 59 to be provided to input port 50 of processor 12, whereby initialization data 306 is set as data 81 in register 61. Processor 10–12 have data 82 and 83 of register 61 set by an initialization packet 202 provided from a corresponding von Neumann type processor.

When initialization data including a processor number is set right after resetting, an initialization packets 202 to respectively respecify (update) branching condition data 82 and 83 of register 61 are provided to each processor if necessary through a route identical to that of the above-described route. Thus, branching condition data 82 and 83 are respectively reset in register 61 of each processor. After the above-described initialization of the system, a data flow program is loaded to each data driven type processor.

Because von Neumann type processor 20 provides to processor 10 via router 13 a plurality of different load packets 200 storing "#0" as processor number 402, processor 10 sequentially writes into program memory 371 the program data 304 stored in input packet 200. As a result, a data flow program is loaded from von Neumann type processor 20 to data driven type processor 10.

Von Neumann type processor 20 also provides a plurality of different load packets 200 storing "#1" as processor number 402 to data driven type processor 11 via router 13. Therefore, processor 11 writes sequentially program data 304 stored in input packet 200 into program memory 371. As a result, a data flow program is loaded from von Neumann type processor 20 to data driven type processor 11.

Furthermore, von Neumann type processor 19 provides a plurality of different load packets 200 storing "#2" as processor number 402 to data driven type processor 12 via router 14. Therefore, processor 12 writes program data 304 stored in input packet 200 sequentially into program memory 371. As a result, a data flow program is loaded from von Neumann type processor 19 to von Neumann type processor 12.

After loading a program to processor 11, or in parallel with program loading, a memory access packet 203 is output to dump the contents of program memory 371 of processor 11 from von Neumann type processor 19. Packet 203 is applied to input port 51 of processor 11 via switches 100, 101, and 102 switched appropriately. Processor 11 dumps program memory 371 using packet 203 provided to input port 51. The dumped result is stored in data field F4 of the packet 203, which is provided to tracer 21 from output port 53. Because the dumped result of memory 371 of the program load of processor 11 is stored in tracer 21, determination can be made whether the operation of loading a program including the path of program loading is proper or not by analyzing the contents of tracer 21 using analyzing unit 191 of von Neumann type processor 19 or analyzing unit 201 of von Neumann type processor 20.

In modifying parameter data in the loaded program after the above-described program loading operation, desired parameter data is output from parameter data input unit 8. This parameter data is generated in load packet 200 in router 14. This packet 200 is provided to processor 12 via router 14, and to processors 10 and 11 via routers 14 and 13, respectively, to be loaded in program memory 371 of each processor. Thus, the parameter data in the program loaded in program memory 371 can be modified arbitrarily.

Memory access packet 203 for accessing memory 18 is output from output port 55 of each processor to be provided to input port 90 of memory I/F 17 via router 15 or 16. Memory I/F 17 receives this packet 203 via input port 90 to access memory 18 via port 92 according to the information of received packet 203. The accessed result is stored as access data 307 in the data field of the received packet 203, and then the packet 203 is output from output port 91 to be provided to router 14. If received packet 203 from memory I/F 17 corresponds to processor 12, router 14 selects the path to provide the packet 203 to processor 12, otherwise selects the path to provide the packet 203 to router 13. Router 13 receives packet 203 concerning the access result of memory 18 to provide the received packet 203 to processor 10 or 11 according to the information stored therein. After reading and writing of memory 18 is carried out by memory access packet 203, the packet 203 is returned to the data driven type processor that sent that packet 203 via router 14 or 13. Thus, each data driven type processor shares memory 18 as an external memory which can be accessed appropriately.

When a data flow program loaded in a data driven type processor is to be executed, data to be operated by each program is applied to router 13 from data input unit 7. Router 13 provides the input data from data input unit 7 via output port 59 or 60 as an execution packet 201. Execution packet 201 from router 13 is applied to processor 10 or 11, and also to processor 12 via processors 10 and 11.

Each processor carries out an operation process according to a data flow program loaded in program memory 371 according to an input execution packet 201. The operation result is sequentially provided to tracer 21 or data output unit 9. Because analyzing unit 191 of yon Neumann type processor 19 or analyzing unit 201 of yon Neumann type processor 20 can monitor in real-time the execution status of a data flow program according to the contents of tracer 21 or data output unit 9, debugging of a program and analysis of the operation of the system can be facilitated.

As shown in FIG. 1, each data driven type processor includes a plurality of input ports through which data packets provided from a plurality of von Neumann type processors are input according to a determination made by a router. Each data packet is output so as to be provided to a determined input port. In other words, a router arbitrates the supply path of a data packet from a von Neumann type processor to a data driven type processor. The number of von Neumann type processors connected to each data driven type processor can be increased by increasing the number of routers.

Although the data processing system of FIG. 1 includes three data driven type processors, the present invention is not limited to the number of three data drive type processors. If one data driven type processor is provided, von Neumann type processors 20 and 19 may be directly connected to the input ports 50 and 51 of that processor without a router to supply a data packet.

If a different program is loaded into each data driven type processor at the time of the above-described program loading, different data flow programs can be executed at the same time. Therefore, a plurality of programs of different users can be executed simultaneously.

If one data flow program is divided into a plurality of programs in advance and each program loaded into respective data driven type processors, one data flow program can be executed in a divisional-parallel manner in each data driven type processor.

Each data driven type processor can be connected to a plurality of von Neumann type processors via a router to carry out a plurality of different data transfer operations simultaneously such as data transfer for program loading and data transfer for memory dumping.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing system comprising:

a data driven type information processor including a plurality of input ports to receive in parallel a data packet supplied to each of said plurality of input ports and for carrying out a plurality of different information processing in parallel, respectively, using said received data packets, an information processing unit for carrying out information processing using said received data packets, and for providing each processed result as a data packet, an input and output control unit for receiving a data packet supplied to each of said plurality of input ports or a data packet provided from said information processing unit, and for providing its received packets to one of an external source of said data driven type information processor and said information processing unit according to a first branching condition;

a control device for receiving in parallel a plurality of data packets and for providing in parallel, to said plurality of input ports of said data driven type information processor, said received data packets, respectively;

a plurality of von Neumann type information processors for providing different types of data packets to said control device; and an output medium shared by said data driven type information processor and said plurality of von Neumann type information processors, wherein said information processing unit carries out in parallel a predetermined information processing and a monitor processing of providing, sequentially via contents of a data packet, a progress state of said predetermined information processing using one of said received data packets, wherein said input and output control unit further comprises means for receiving a data packet provided by said monitor processing and for providing the same to said output medium, wherein each of said plurality of von Neumann type information processors further comprises:

analyzing means for analyzing in real-time the progress state of said predetermined information processing according to the contents of the data packet provided to said output medium by the monitor processing, during performance of the predetermined information processor.

2. The data processing system according to claim 1, wherein said control device comprises:

data receiving means for receiving in parallel said data packets, and data providing means for providing in parallel to a corresponding input port of said data driven type information processor, said data packet received by said data receiving means.

3. The data processing system according to claim 2, wherein said data providing means further comprises selecting means for selecting an input port of said data driven type information processor, corresponding to said data packet received by said data receiving means, according to a second branching condition.

4. The data processing system according to claim 3, wherein said data providing means further comprises second setting/updating means for setting or updating said second branching condition using contents of a data packet received from said data receiving means.

5. The data processing system according to claim 2, wherein each of said data packets comprise a tag field for storing tag information and a data field for storing operand data, wherein said control device comprises:

tag information storing means for storing in advance a plurality of said tag information, operand data receiving means for receiving externally applied operand data, and means for reading out tag information from said tag information storing means according to operand data received by said operand data receiving means, generating a data packet storing such received operand data and such read out tag information into said data field and said tag field, respectively, and providing such a generated data packet to said data providing means.

6. The data processing system according to claim 1, wherein said input and output control unit further comprises first setting/updating means for setting or updating said first branching condition using contents of a data packet supplied to each of said plurality of input ports.

7. A system for monitoring at least one aspect of an activity of a data driven processor, the monitoring being performed by a von Neumann processor during the activity, comprising:

a data driven processor for executing the activity; and a von Neumann processor for monitoring the at least one aspect of the activity during that activity of the data driven processor, wherein:

the activity being monitored is that of loading of a data flow program data packets incrementally into a program memory of the data driven processor, under control of the von Neumann processor, via load packets and the aspect of the activity being monitored is that of a route taken by each program data packet during loading from an external source of the program data packet to the program memory of the data driven processor;

the system further comprising:

temporary storage means, operatively connected to the data driven processor and the von Neumann processor, for receiving at least one program data packet from the program memory of the data driven processor and storing the at least one program data packet for access by the von Neumann processor, during continued loading of the data flow program data packets into the program memory of the data driven processor; and the von Neumann processor including:

confirmation means, operatively connected to the temporary storage means, for confirming, during the continued loading, that each dumped program data packet was loaded properly and that a proper route was taken by each program data packet during loading.

8. A system as in claim 7, wherein:

there are at least two data driven processors and at least two von Neumann processors; and wherein one von Neumann processor monitors activity of one data driven processor.

9. A system as in claim 7, wherein:

a further activity being monitored is that of an operation process of the data driven processor performed according to a data flow program stored in a program memory of the data driven processor;

the aspect of the further activity being that of an operation result of the operation process performed by the data driven processor;

the system further comprising:

a tracer for storing at least one operation result;

means for outputting an operation result of the data driven processor to a tracer, during performance of the operation process by the data driven processor; and the von Neumann processor including:

analyzing means, operatively connected to the tracer, for analyzing, during performance of the operation process by the data flow program, an execution status of the operation process as a function of an operation result stored in the tracer.

* * * * *